Figure 1:
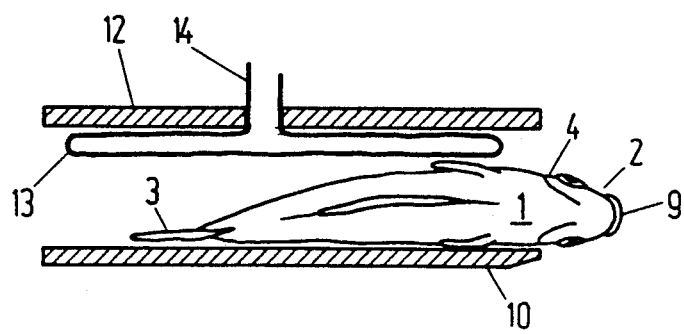

United States Patent [19]

Nielsen

[11] Patent Number: 5,045,023
[45] Date of Patent: Sep. 3, 1991

[54] METHOD AND APPARATUS FOR BEHEADING FISH, AND METHOD AND APPARATUS FOR EXTRACTING ROE OR MILT FROM A FISH

[75] Inventor: Henrik M. Nielsen, Haarby, Denmark

[73] Assignee: Cabinplant International A/S, Harby, Denmark

[21] Appl. No.: 529,348

[22] Filed: May 25, 1990

[30] Foreign Application Priority Data

May 30, 1989 [DK] Denmark .............................. 2635/89

[51] Int. Cl.⁵ ............................................. B65B 23/22
[52] U.S. Cl. ..................................... 452/185; 452/194; 452/195; 383/3
[58] Field of Search .................. 17/63, 58, 55, 59, 60, 17/70; 383/3; 452/185, 194, 195

[56] References Cited

U.S. PATENT DOCUMENTS

| | | | |
|---|---|---|---|
| 2,322,831 | 6/1943 | Danielsson | 17/58 |
| 3,503,094 | 3/1970 | Kennedy | 17/70 |
| 3,707,019 | 12/1972 | Wiggins | 17/58 |
| 3,754,301 | 8/1973 | Grimes | 17/58 |
| 3,908,231 | 9/1975 | Price et al. | 17/70 |
| 4,155,453 | 5/1979 | Ono | 383/3 |
| 4,267,684 | 5/1981 | Ambrose | 383/3 |
| 4,599,765 | 7/1986 | Kristinsson | 17/63 |

*Primary Examiner*—Willis Little
*Attorney, Agent, or Firm*—Thomas R. Vigil

[57] ABSTRACT

An apparatus for beheading fish comprises a supporting plate 10, a cover plate 12, and a fluid bag 13 with a fluid inlet 14. The apparatus is open at both ends, and the fish is placed with the head free. Fluid under pressure is thereafter introduced through the inlet 14 into the fluid bag 13 which is thereby inflated to the shape as shown. As the bag is resilient, but is confined between the fish and the supporting plate 10 and the cover plate 12, respectively, the fish will thereby be seized between the bag and the supporting plate. An extremely effective and firm mechanical seizure of the fish is thereby achieved, even under moist, slimy or slippery conditions likely to prevail where fish are being processed. When the fish is seized by an appropriate pressure in the fluid bag 13, it is held so firmly that the head can be torn off. This is performed by means of the tool seen to the right in the figure and which comprises a plane abutment plate 16 which is pushed in below the front edge of the supporting plate 10, a pivotal gripping jaw 15, being shown in the figure in its free position above the fish approximately abreast of the gill cover 4. If also the ear bone of the fish is removed, the roe can be removed from the fish by increasing the fluid pressure in the bag, so that the roe is squeezed out.

The invention also comprises methods for beheading fish and for extraction of roe or milt from a fish.

8 Claims, 5 Drawing Sheets

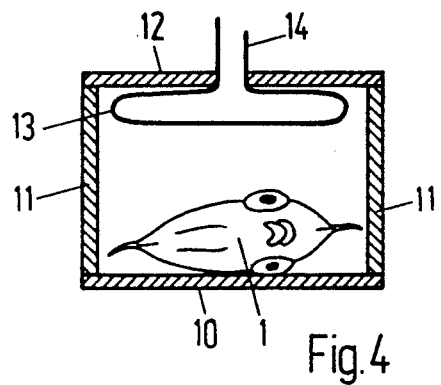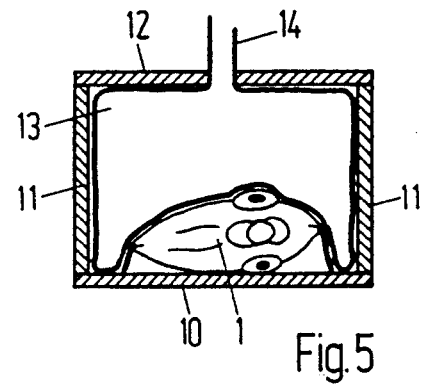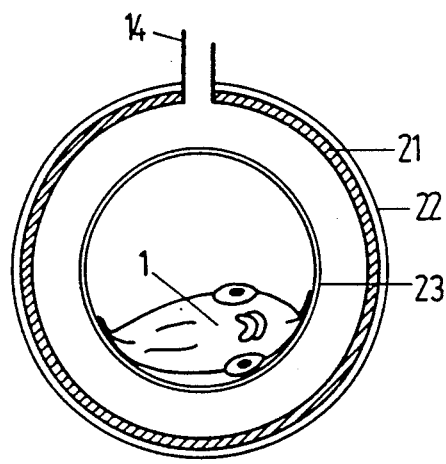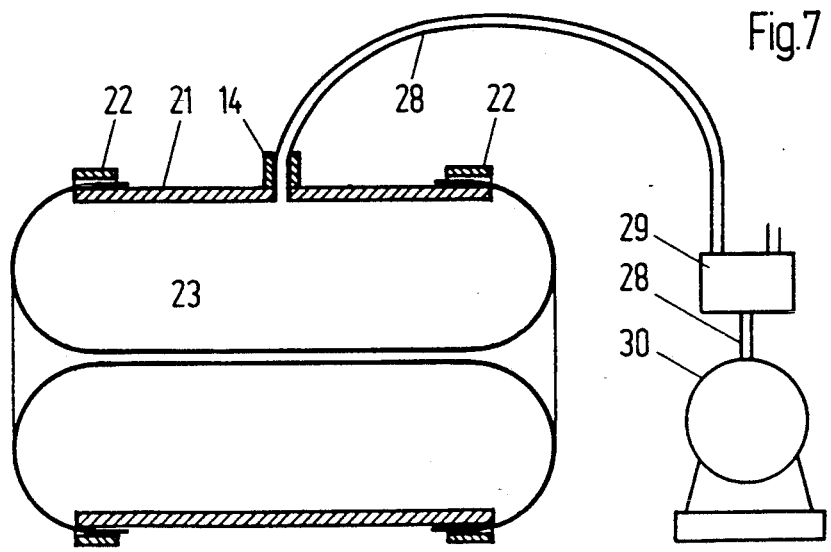

METHOD AND APPARATUS FOR BEHEADING FISH, AND METHOD AND APPARATUS FOR EXTRACTING ROE OR MILT FROM A FISH

The present invention relates to a method for releasable, mechanical seizure of an object, in particular a fish, a method for beheading fish, and a method for extracting roe or milt from a fish. The invention furthermore relates to an apparatus for releasable, mechanical seizure of an object, such as a fish, an apparatus for beheading fish and an apparatus for removing roe or milt from a beheaded fish.

Caught fish are nowadays processed industrially in large quantities, and methods and apparatuses for facilitating or improving the processing are therefore of great interest. The processing methods depend on the fish species and the desired end product, f. ex. whole or cut up fish for consumption or trash fish, and substantially all parts of a fish can today be utilized in one form or the other, at least for extraction of fish oil or for the production of fishmeal.

In many cases it is preferred to remove the head and possibly also the entrails, the removed parts being processed as trash fish, while the remainder is used for consumption. Such processing is for instance applied for anchovy.

A method of processing which is of great commercial importance is the extraction of roe or milt from fish. On certain markets for instance, whole, uninjured roe from herring or cod is very much in demand and can be sold at such high prices that it is profitable to extract and sell the roe separately and utilize the remainder of the fish as trash fish. The same may be the case for the milt of the male fish.

The mentioned methods of processing are today to a large extent carried out manually, as it is very difficult to mechanize these processes. Among the reasons which make it difficult to mechanize the processing can be mentioned the varying sizes and shapes of fish, also among fish of the same species and category, as well as the inevitable requirements for frequent cleaning of all tools. In principle, beheading of fish is a simple technical task, whereas it is difficult in practice, because the cut must be located relatively accurate in relation to the bones of the fish to achieve a result, which also seen from an aesthetic point of view, is acceptable.

For the mentioned extraction of roe, the whole pouch of roe must be taken out intact. The fish must necessarily be cut up for extraction of the roe, and this extraction is made possible by removing the head and ear bones (the claviclae: The crescent-shaped bones lying close to the rear edge of the gill of the fish), whereafter the roe can be squeezed out. It is however, very difficult to cut off the head from the fish without hitting the roe, with a risk of injuring the roe pellicle.

Tearing off the head is difficult, because the fish is very slimy and slippery and moreover has a shape which makes it very difficult to hold its body firmly.

These methods of processing are traditionally carried out manually, whereby a person grips the fish with one hand, while he grips its head with the other hand and partly twists, partly pulls it off, whereafter the roe gently is squeezed out. This job is relatively slow, dirty and unpleasant, a.o. because the fish, for health reasons, must be kept cool, so that it is necessary to work in cold premises.

Norwegian publication print no. 134 091 discloses an apparatus for the removal of roe and entails from beheaded fishes. In this apparatus a fish is placed on a flat, essentially horisontal support, held by the tail by the engagement of a gripping means, whereafter a pressure roller is pressed onto the side of the fish near the tail and rolled along the fish in the direction from the tail end towards the front end, in order to squeeze out the roe. The construction of the apparatus is very complicated, which is inevitable in order to achieve this method of operation requiring accurately sequenced and synchronized movements of a number of mechanical parts. The complicated design makes the apparatus very costly and implies in addition to that difficulties in cleaning operations, so that extended shut-down intervals will be required in order to perform satisfactory cleaning. As the fish is held by gripping means engaging the tail section in order to resist the forward pull caused by the pressure roller, there is the danger that the tail grip is insufficient if the tail section is too thin or in case the point where the gripping means engages the tail is placed too far back. On the other hand, this point cannot be displaced very far forwards, as there must also be adequate room for the roller to engage the rear portion of the fish. In order to ensure a proper grip by the gripping means, the fish should ideally be registered so as to have the tail portion at an accurate position relative to the gripping means, for any size of the fish. This is, however, impractical. Another problem associated with the method of rolling a pressure roller along the fish is that the unsymmetrical structure and shape of the fish may have the result that the pressure roller merely attacks the bones of the fish, possibly breaking or crushing these bones, whereas the pressure applied to the belly portion of the fish may be insufficient for driving forward the roe. In order to overcome this problem, the Norwegian publication print discloses the use of conical pressure rollers. Such rollers require, on the other hand, that each and every one of the fishes to be treated by the apparatus must be oriented onto a particular, predetermined side, which is obviously a further complication representing increased costs in the utilization of the apparatus. A further disadvantage is that the rollers, while rolling along the fish, will tend to press the fish sidewardly so that it will be necessary to restrict the sidewards motion of the fish. Although, it is possible to design support fixtures for restricting sidewards motion of the fish, this will limit versitility of the apparatus by limiting the range of sizes and shapes of fishes that can be treated.

According to the invention, a method for releasable, mechanical seizure of an object is provided as stated in claim 1. It is hereby achieved that an object may be gripped and secured mechanically without damaging the surface of the object, even in case of the objects having a very delicate surface.

According to the invention a method of beheading fish, as stated in claim 4, is provided. It is hereby achieved that the head of the fish can be removed without in any way injuring the fish body.

According to the invention a method for extracting roe or milt from a fish is provided, as stated in claim 5. It is hereby achieved that the roe or milt can be taken out whole, absolutely uninjured and with its shape intact.

According to the invention an apparatus for releasable, mechanical seizure of an object is provided, as stated in claim 6, and an apparatus for beheading fish is provided, as stated in claim 7. An apparatus is hereby provided by means of which the fish head can be removed readily and quickly and without any risk of injuring the fish body, the roe or the milt. The apparatus may furthermore be applied for removing the roe or milt from the fish by the above-mentioned method. The invention further provides an apparatus for driving out roe or milt from a beheaded fish as stated in claim 9.

Figure 2:
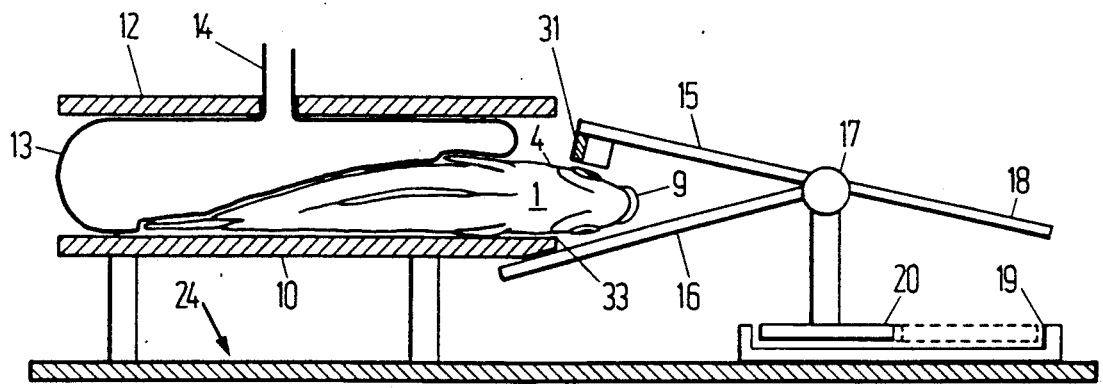
Figure 3:
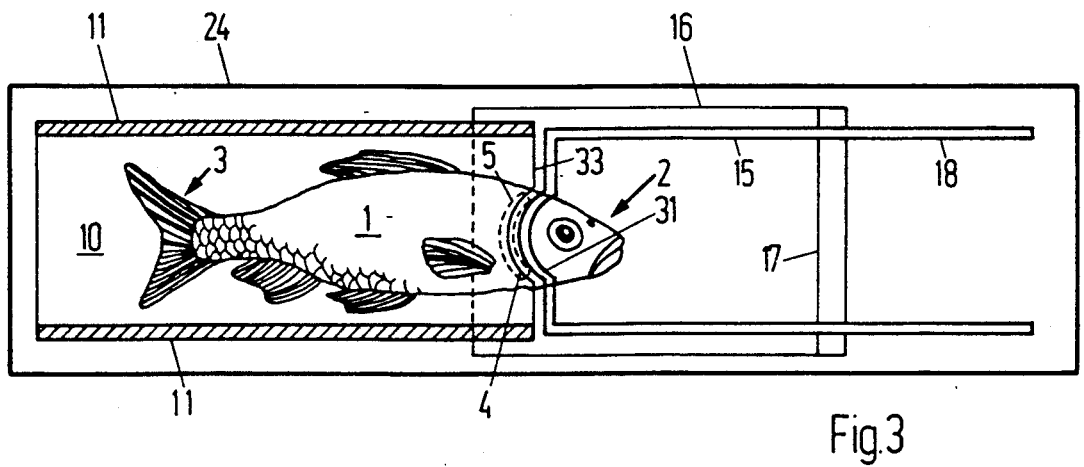
Figure 8:
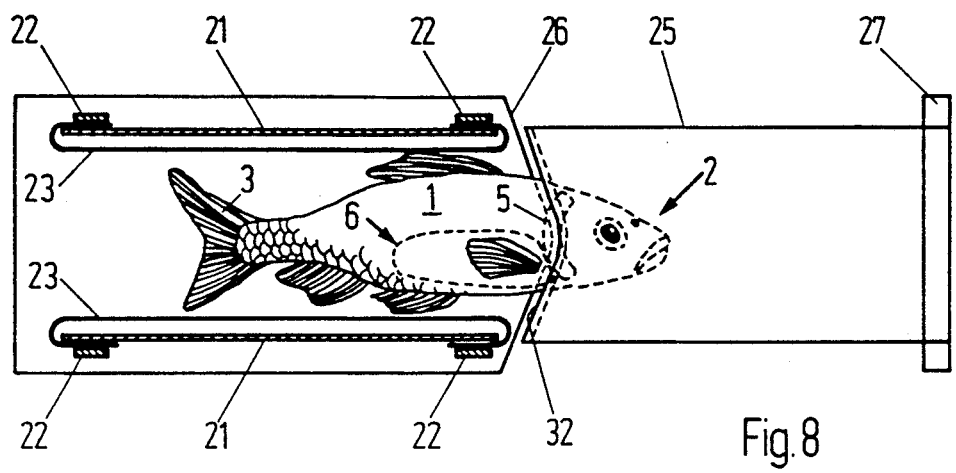
Figure 9:
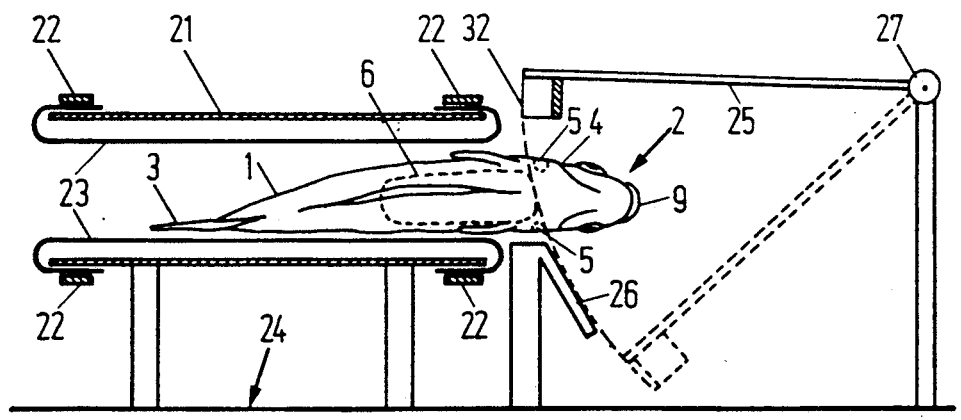
Figure 10:
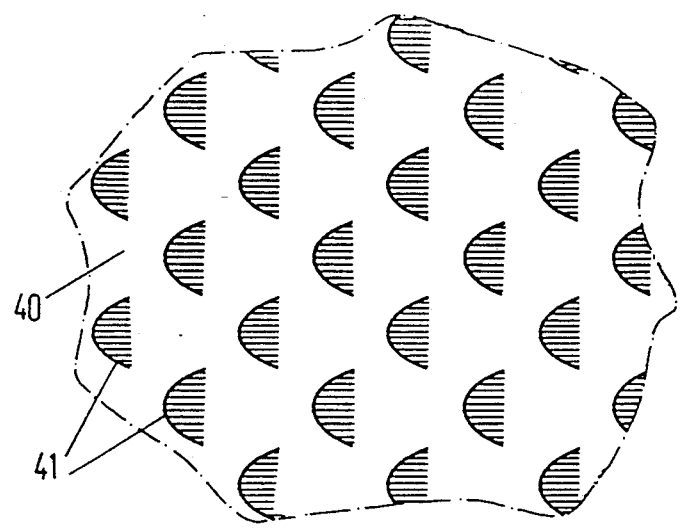
Figure 11:
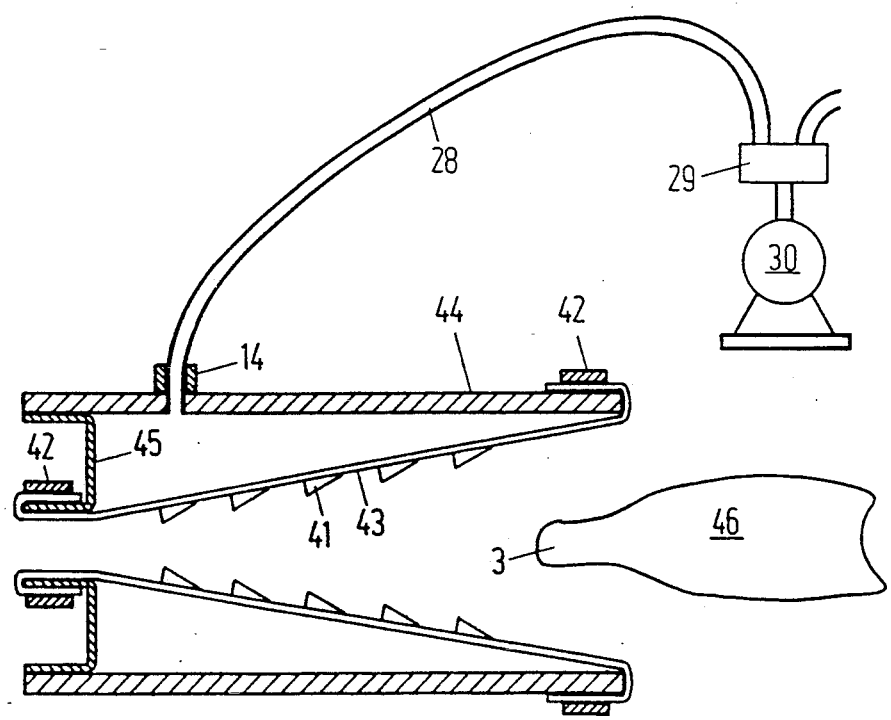
Figure 12:
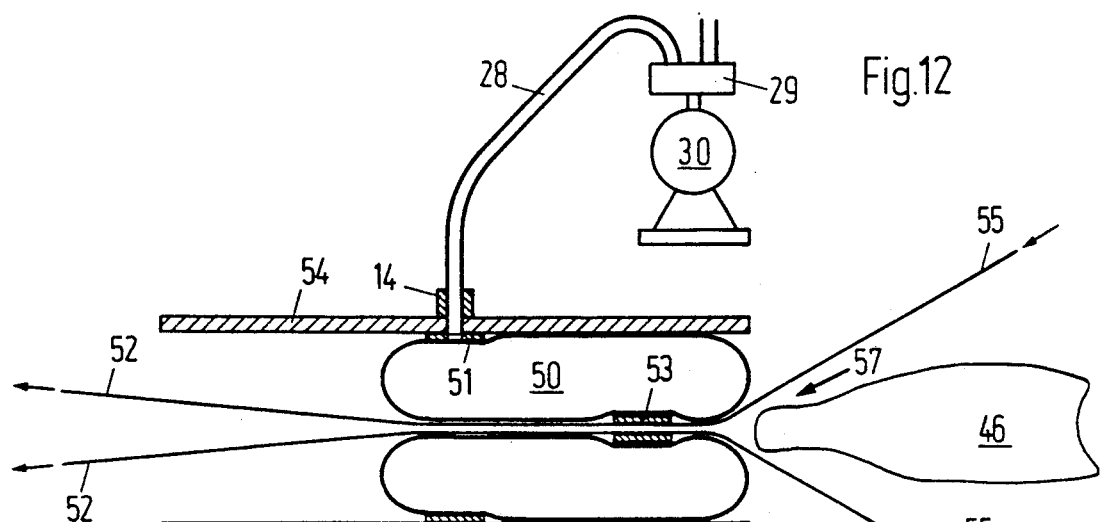
Figure 13:
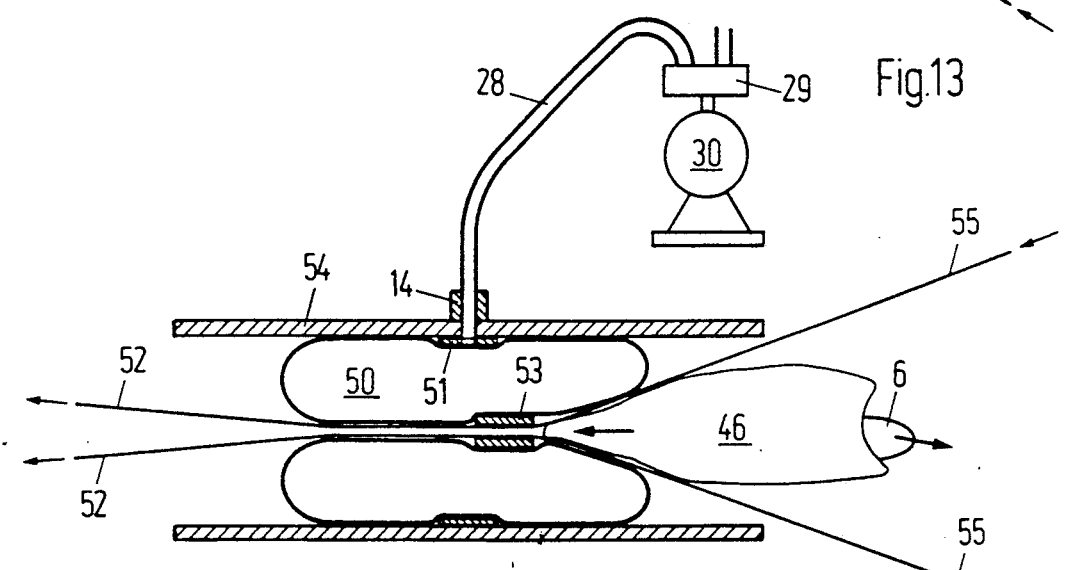
Figure 14:
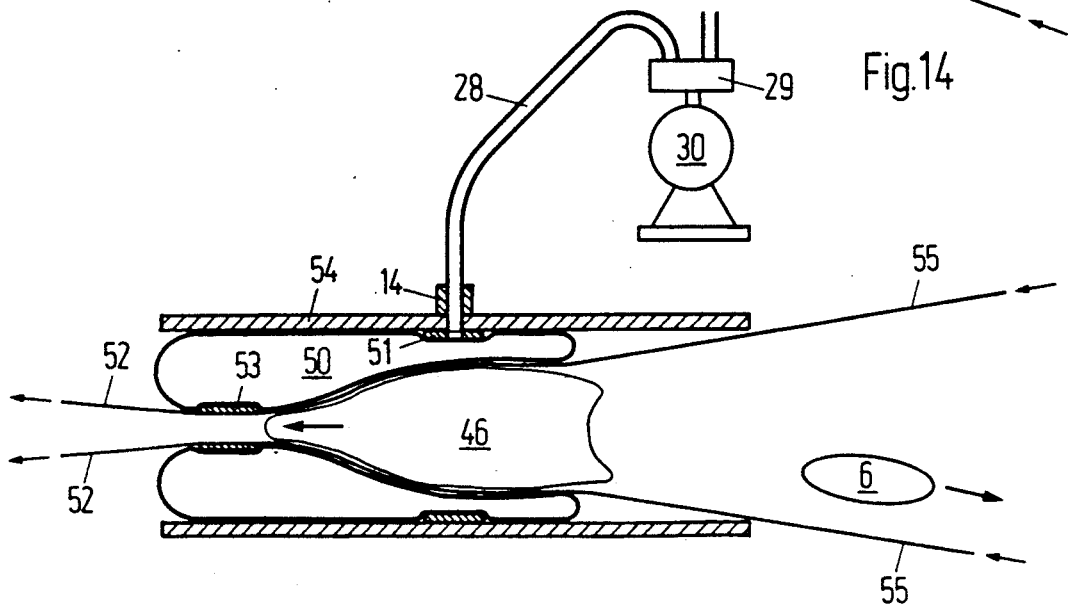

The invention will be explained in more detail in the following and with reference to the drawings, in which FIG. 1 shows a vertical longitudinal section through parts of an apparatus according to the invention, for removing the head of a fish in a first working step, FIG. 2 shows a view of the apparatus of FIG. 1 supplemented with a number of additional features and illustrated during a subsequent step of operation, FIG. 3 shows a plane sectional view of the apparatus corresponding to FIG. 2, FIG. 4 shows a vertical, transverse section of the apparatus as shown in FIG. 1, FIG. 5 shows a vertical section through the apparatus corresponding to FIG. 2, FIG. 6 shows a vertical, transverse section through an apparatus according to the invention for cutting off the head of a fish, FIG. 7 a general view of the apparatus of FIG. 6, FIG. 8 shows a horizontal section through the apparatus of FIG. 6, FIG. 9 shows a vertical longitudinal section through the apparatus of FIG. 6, FIG. 10 is a fragmentary, planar view of a portion of a fluid-tight bag wall, FIG. 11 shows a vertical, longitudinal section of an apparatus for the seizure of a fish according to another embodiment of the invention, and FIGS. 12, 13 and 14 show longitudinal sections through an apparatus for driving out roe or milt from a fish according to yet another embodiment of the invention.

Reference first being made to FIG. 1, certain main components of the apparatus for the seizure and for the beheading of fish are shown, viz. the supporting plate 10, the cover plate 12, and a flexible, fluid-tight bag 13 with fluid inlet 14. The bag is shown in a state without pressure and is therefore contracted by its inherent resilience to a state where ample space is allowed between the fluid bag and the supporting plate 10 for inserting a fish 1 with head 2 and tail 3. It will be appreciated that fish of widely differing lengths can be inserted in this apparatus being open at both ends, but preferably, the fish is always placed with the head extending freely outside one end of the holding apparatus, comprising essentially the components shown in FIG. 1. This is done by placing the fish with the snout at a predetermined distance in front of the apparatus, which in practice may be secured by f.ex. arranging a sort of stopper or abutment (not shown) against which the snout of the fish is pushed.

When the fish is in the position shown in FIG. 1, fluid, e.g. gas or air, under pressure is introduced through the fluid inlet 14 into the fluid bag 13, which is thereby inflated to the state shown in FIG. 2. As the bag is flexible, but confined between the fish, the supporting plate 10 and cover plate 12, respectively, the fish will thereby be held firmly between the bag and the supporting plate. Since most species of fishes including those here contemplated have wedge-shaped or guttiformed bodies with the broadest section at or just behind the gills and tapering gradually down in the direction towards the tail section, a squeezing of the body portion not engaging the head will produce a forwardly directed force tending to push the fish forwards. As fishes are generally slimy and slippery, it would be expected that an apparatus as shown in FIG. 1 would, upon application of a fluid pressure in the bag 13, immediately expel the fish towards the right in FIG. 1.

Surprisingly, though, practical experiments have shown that the friction, which may be obtained between the fish body and the surfaces of the bag and of the supporting plate, respectively, may suffice for obtaining an extremely good and safe mechanical securing of the fish, capable of serving as counterhold for tearing away the head, even under moist, slimy, and slippery conditions likely to occur when fish are being processed. The friction has been found to be sufficient in practical embodiments where the flexible bag 13 was made of rubber and the supporting plate 10 and the cover plate 12 was made of stainless steel, all of the surfaces being smooth. Obviously those surfaces of the fluid bag 13 and of the supporting plate 10, intended to contact the fish, may be roughened or surface treated in any other way in order to increase the friction in circumstances, where that would be needed. Surface preparations, which may be used according to the invention in order to enhance the friction, could comprise etching, hammering, grinding, adhering a layer of sharp-edged particles, or milling or casting of surfaces with projecting serrations or other methods belonging to the state of art. One example of a surface designed to increase friction will be explained in the following with reference to FIG. 10.

In further explanation of the embodiment of the apparatus, reference is also made to FIGS. 4 and 5, showing transverse sections through the holding apparatus in stages of operation corresponding to FIG. 1 and 2, respectively. FIG. 4 shows the stage of operation corresponding to FIG. 1, where there is no pressure in the fluid bag 13 and with the fish 1 lying loosely on the supporting plate 10 between the side walls 11. The supporting plate 10, the side walls, and the cover plate are substantially non-resilient and jointly form a tube-formed casing enclosing the fish and the resilient fluid bag 13. The types of fish intended to be processed according to the invention are of such shape that they will come to rest lying on the side, as shown in FIG. 4. The apparatus may, however, be used for other types of fish as well. FIG. 5 shows the subsequent step, where the fluid bag has been put under pressure and fills the space above the fish and between the side walls 11, and squeezes the fish against the supporting plate. It will be appreciated that a large spectrum of sizes or shapes of fish may be placed in the apparatus and be held firmly by the fluid bag 13 by friction against the bag and against the tube-formed casing.

When the fish has become seized by an appropriate pressure in the fluid bag 13, it is held so firmly that its head can be torn off. This may be done by means of the tool shown to the right in FIG. 2 and which comprises a plane holding plate 16 which is pushed in below the front edge of the supporting plate 10 and a pivotal gripping jaw 15, which in FIG. 2 is shown in the free position above the fish approximately abreast of the gill cover 4. The gripping jaw 15 and the holding plate 16 are connected by a pivot joint 17, and they are provided with a sort of activating mechanism, in that for example a pivot arm 18, as shown in the figure, may pivot the gripping jaw 15, while the holding plate 16 is unpivotable. The supporting plate 10 is at the front end provided with an edge 33 which may serve as cutting abutment for the gripping edge 31 of the gripping jaw 15.

As shown in FIG. 2, the pivot joint 17 is rigidly connected to a slide shoe 20 being guided in a supporting rail 19, so that it is movable within limits being defined by the supporting rail 19. These limits are so adapted that the gripping jaw 15 can be displaced to a position above the fish's head, approximately abreast of the gill cover 4, as shown in the plane view of FIG. 3.

As it may be seen in FIG. 2, the gripping jaw has a gripping edge 31, and FIG. 3 shows its curved shape which largely corresponds to the crescent-like contour of the gill cover 4 of the fish. The curve is formed in this manner to enable the edge 31 of the gripping jaw 15 to engage the fish's head firmly at the gill cover 4 in front of the ear bone 5, whereby the fish's head may be partly cut, partly torn off, leaving the ear bone of the fish in the fish body. The abutment edge 33 is curved corresponding to the form of the gripping edge 31, and its position is so adapted that a gap is left between the edges when the gripping edge 31 passes the abutment edge 33. The gripping jaw 15 is by suitable use of the pivot arm 18 moved past the abutment edge 33 and against the holding plate 16, whereby the head is partly cut off and engaged between the gripping jaw and the holding plate 16. Having engaged the head, the gripping jaw 15 and the holding plate 16 is displaced to the right in FIG. 2 by displacement of the slide shoe 20 along the supporting rail 19.

Due to the gap between the edges 31 and 33, the cut is not sharp and complete, but leaves some of the entrails of the fish still adhering to the head so that they are pulled out as the head is pulled away. According to a particularly preferred embodiment the holding plate 16 is made resiliently flexible in order that the head and the entrails may be held firmly without being cut through, since the force, by which the gripping edge acts on the fish head, is limited by the resilience of the holding plate.

Having been displaced to the right, the pivot arm 18 with the gripping edge 31 is opened again, and the head with appended entrails is removed and collected. The fluid pressure inside the bag 13 is released and the beheaded body of the fish is also removed and collected.

As apparent from FIG. 3, the curved shapes of the gripping edge 31 and of the abutment edge 33 are symmetrical about the longitudinal, vertical median plane through the holding apparatus. It is hereby achieved that the gripping tool works equally well, whether the fish is lying on one side or the other, which is a great, practical advantage.

In the following, a further embodiment of the apparatus is described with reference to FIGS. 6, 7, 8, and 9, said embodiment in particular being suitable for beheading of fish and for extracting roe or milt from fish such as herring or cod.

As apparent from the transverse section of FIG. 6 and from the longitudinal section of FIG. 7, the apparatus according to this embodiment of the invention comprises a rigid, essentially cylindrical and fluid-tight tube 21, with a flexible, fluid-tight tube 23, such as a tube of elastic rubber, inserted therein in a sealed fashion, such as by being corbelled around the ends of the rigid tube 21, and secured thereto in fluid-tight manner by means of circumferential clamps 22. The rigid tube is provided with a tube fitting 14, which by compressed-air hoses 28 is connected to a valve means 29, whereby compressed air can be supplied from a compressor 30 to the space between the rigid tube and the flexible tube in a controlled manner. The valve 29 is switchable so that air can either be supplied to the apparatus, or the apparatus can be ventilated into the open air, or the apparatus may be evacuated.

In order to illustrate the potential operation of the apparatus, FIG. 7 shows a situation where there is no object inserted inside the tubes and where compressed air is being supplied so that the flexible tube 23 is being compressed toward the centre line of the rigid tube 21. When the pressure is reduced, the flexible tube 23 moves outwards by its inherent resilience to the contour shown in FIG. 6, providing ample space for inserting a fish 1 inside the resilient tube. If appropriate, e.g. if the flexible tube is non-resilient, the compressor 30 and the valve means 29 may be operated to evacuate the space around the flexible tube 23 so as to expand it against the wall of the rigid tube 21.

FIG. 9 shows a vertical longitudinal section through the apparatus in a situation where a fish has been inserted in the flexible tube, but before compressed air is being supplied to the apparatus. The Figure shows the rigid tube mounted on a supporting frame 24 which also supports a pivot pin 27 for a tool or a mechanism for cutting or tearing off the head of the fish. This tool comprises a cutting jaw 25 being pivotal about the horizontal axis 27, and a cutting abutment 26 with inclined surface. After the fish has been arrested by supplying compressed air around the resilient tube 23, the cutting jaw 25 is swung downwards to the position indicated in dashed lines in FIG. 9 and thereby cuts off the head of the fish by an action in co-operation with the cutting abutment 26.

FIG. 8 shows a plane section view through the same apparatus as in FIG. 9, and it shows how the cutting edge 32 of the cutting jaw 25, seen in the plane view, has a curved contour, the concave side of the curve facing the fish body, and the convex side facing the fish snout 9 (contrary to the embodiment shown in FIG. 3). Practically, the fish is placed with the snout 9 in a predetermined position in relation to the apparatus, said position being so adapted that the apparatus with the fish being processed and with the illustrated form of the cutting jaw cuts off the head, including the ear bone, from the fish body (contrary to the FIG. 3 embodiment of the apparatus). FIG. 8 also in dashed lines shows the roe 6 immediately behind the ear bone 5 of the fish. When the ear bones have been torn off, there is free access to the roe or to the milt.

When the cutting jaw 25 swings about a pivot pin 27 which is positioned in front of and at a distance above the fish, as seen in FIG. 9, the cutting jaw—simultaneously with the cutting—also imparts a partially pulling movement onto the fish head. The cutting edge 32 of the cutting jaw 25 and the corresponding edge of the cutting abutment 26 are preferably not sharpened, but rather slightly rounded, whereby it is achieved that the pellicle enclosing the roe 6 is not damaged, even if it should touch the cutting edges. Instead thereof, the roe is gently pushed aside if contacted by the cutting edge 32.

From FIG. 8 it furthermore appears that the contours of the cutting edges 26 and 32 are symmetric about the longitudinal, vertical median plane through the holding apparatus of FIG. 8. It is hereby achieved that the apparatus performs its function equally well, whether the fish is lying on one side or the other.

The cutting edges pass each other, leaving a small gap between them, which—in combination with the rounded character of the edges and with the inclined direction of travel of the cutting edge—causes the head to be partly cut and partly torn off, the pressurized, flexible tube 23 holding back the body portion of the fish.

After removal of the head, the pressure around the flexible tube 23 is partially reduced by suitable control of the valve means 29, and the tube 23 is then reinflated by renewed supply of compressed air. This fluid pressure simply squeezes out the roe or the milt, respectively, complete within its pellicle, so that it can immediately be collected for further processing. The pressure around the flexible tube 23 is then again reduced by operation of the valve means 29, and the remainder of the fish can be taken out of the tube for further processing.

Although the apparatus shown in FIGS. 8 and 9 is shown and described as a combination of a device for tearing off the head of the fish and a device for pressing out the roe of the fish, it is obvious that these devices may be used separately or independently. Thus the cutting device may be used to take off the head of the fish, the tube 23 serving merely to arrest the fish, or the flexible tube 23 within the rigid tube 21 could be used without the beheading device in order to squeeze out roe or milt from fish beheaded by any other known method.

Reference is now made to FIG. 10, showing a surface plan of a portion of a flexible material, e.g. a rubber membrane, which could be a portion of the flexible tube 23 or of the air bag 13. FIG. 10 shows how the surface of this membrane has been designed with serrations or projections shaped as inclined half-circular areas with sharp, projecting edges and oriented so as to ensure a firm grip onto the skin of the fish by supplementing the friction hold by a mild saw-tooth action, restricting forward motion of the fish. According to a preferred embodiment these projections have a height between 1–2 mm, and preferably about 1,5 mm, whereas the spacing between these projections is between 5–20 mm, and preferably around 10 mm. According to another preferred embodiment (not shown in the figures) the rubber surface is treated to increase its friction onto the skin of the fish by gluing dispersed, sharp-edged particles, e.g. sand particles, onto the surface.

FIG. 11 shows another embodiment of a gripping and roe-removing device, which may be used for holding a fish or for removing roe or milt from beheaded fishes. The device in FIG. 11 comprises a rigid, essentially cylindrical tube or pipe 44 with a circular end plate 45 with a central, essentially circular opening inserted into the leftmost end as shown in FIG. 11. The circular end plate 45 is formed like a flat, radially extending disc with axially extending flanges at its inner and outer margins.

A flexible, conically shaped tube or hose 43 is inserted into the rigid pipe 44, and attached, the wider end of the conical hose being attached in a sealed fashion to the rightmost end of the rigid pipe 44 by means of clamps 22 and the narrow end being inserted through the central orifice in the end plate 45 and also attached there in a sealed fashion by means of clamps 22. The attachments are fluid-tight, and the flanged disc 45 is also mounted inside the rigid pipe 44 in a sealed manner. Similar to the other embodiments fluid hoses 28 connect the rigid pipe 44 with a compressor device 30 through a valve means 29.

The flexible, conically shaped pipe or hose 43 is provided with surface projections in a saw-tooth like manner, e.g. projections as shown in FIG. 10 in order to improve the grip onto the fish. The operation of the device according to FIG. 11 is similar to that of the device shown in FIG. 8 and 9, so reference may be had to the explanation given above. The device according to FIG. 11 may for facilitating the insertion of the fish be operated so as to utilize the compressor 30 and the valve means 29 to evacuate the space inside the rigid pipe 44 so that the flexible tube 43 is expanded to lie almost in contact with the inside walls of the rigid pipe 44. Having inserted the fish, the valve means 29 may be operated so as to vent the space inside the rigid pipe 44 to the ambient atmosphere. Hereafter the conically shaped, flexible tube 43 approximates the outer contour of the fish more closely than it is the case with the corresponding cylindrical tube of the embodiment according to FIG. 8 and 9 and tends therefor to perform even better, when pressing out the roe or the milt from the fish, as the pressure is applied more evenly over the fish surface.

A further preferred embodiment of the apparatus to remove roe or milt from fish will now be described with reference to FIGS. 12, 13 and 14. Similar to the embodiments previously described, this embodiment comprises a rigid supporting pipe 54 connected through a pipe fitting 14, a fluid hose 28 and valve means 29 to a compressor 30. In this embodiment the rigid pipe 54 is approximately cylindrical and open in both ends. Inside the rigid, cylindrical pipe 54 a toroid-shaped, fluid-tight, flexible bag 50 is arranged. This fluid-tight bag 50 is attached to the inside of the rigid cylindrical pipe 54 along an annular region hereof, so that it may to some extent be moved by rolling forwards and rearwards in directions parallel to the center line of the cylindrical pipe 54 without disrupting the fluid connection between the fluid-tight bag 50 and the pipe fitting 14 arranged in this region.

The motion of the fluid-tight bag 50 is controlled by pulling straps 52 and 55 attached to an approximately cylindrical region 56 at the inner, central opening of the fluid-tight, flexible bag 50. The flexible bag 50 may be pulled towards the left in FIGS. 12, 13 and 14 by rearward pulling straps 52, or it may be pulled towards the right in the figures by forward pulling straps 55. The surface of the fluid-tight, flexible bag 50 may be provided with projections or other friction-improving means as described above with reference to FIG. 10. This device is used to squeeze out roe or milt from a beheaded fish in the manner that the fluid bag is displaced to its rightmost position by pulling the forward straps 55 towards the right as shown in FIG. 12, whereafter the beheaded fish is placed with its tail 3 towards the mouth section 57 leading into the inner, central opening of the fluid bag 50.

With the fish tail 3 slightly engaged in the mouth opening 57 of the fluid bag 50, the fluid bag 50 is gradually pulled to the left side (cf. FIG. 13) by pulling the rear straps 52. The pressure inside the fluid-tight bag 50 is maintained at an essentially constant value by suitable operation of the compressor 30 and the valve means 29. As it may be understood by reference to FIG. 13, the fluid bag 50 rolls gradually towards the left in FIG. 13, pulling the fish with it by surface friction while applying a pressure to the sides of the fish over a region progressing from the rear end towards the forward end of the fish. This pressure gradually drives out the roe or the milt, respectively.

FIG. 14 shows the position where the flexible bag 50 has been pulled to the left by pulling the rearward straps 52, and the roe or milt has been completely expelled from the fish body. The roe or milt is collected for further processing, and the remaining part of the fish body may now easily be removed by rolling the fluid bag 50 towards the right by pulling the forward straps 55, until the fluid bag 50 has returned to its initial position as shown in FIG. 12.

Although a particular embodiment is shown in FIG. 13 and 14, numerous modifications hereof will be obvious to persons skilled in the art. The toroidal bag 50 could e.g. be moved by applying pressure onto the outside of the bag or onto the body of the fish, or it could be sectionalized so as to be movable by suitably varied balancing of the inflation pressure among various sections rather than by being pulled by straps.

According to a particular, preferred embodiment the forward straps 55 are omitted, this embodiment relying upon the effect of the fluid pressure onto the generally tapered fish body to provide the force for driving out the fish from the pipe 54, once the rearward straps 52 are released.

Although various parts in the embodiments have been described in particular arrangements and combinations, it is obvious that these parts may alternatively be used separately and in combination with conventional apparatuses and conventional methods and operations, respectively.

Although the embodiments of the invention have been explained with reference to specific species of fish, they are obviously applicable to many other species of fish as well, and the methods and apparatuses for the releasable seizure of an object could be applied to other objects as well with a particular advantage for objects, which are difficult to seize by other means. Thus the description of the preferred embodiments should not be construed to limit the invention, which on the contrary includes all variations and modifications thereof appearing to a person skilled in the art as limited only by the appended claims.

I claim:

1. A method for releasable, mechanical seizure of an object relative to a supporting surface comprising the steps of: placing said object adjacent one side wall of a flexible, fluid-tight bag, placing the object with one side thereof against a firm abutment surface which can withstand the force of fluid pressure, and introducing fluid under pressure at the opposite side of the bag wall so as to urge said bag against said object, whereby the object is engaged by friction between at least a portion of the object surface, and a surface, which is arrested relative to said supporting structure.

2. A method according to claim 1 wherein said object is a fish, said bag is part of a tube-formed casing and said step of placing includes placing said fish in a predetermined position with its body portion within said substantially tube-formed casing, said fish being seized by the step of introducing fluid under pressure into said fluid-tight bag arranged within the casing so that wall of said bag applies pressure onto at least a part of the fish, whereby the fish is engaged by the friction between at least a portion of the fish body surface and the surface which is arrested relative to said supporting structure, and said method further includes the step gripping the heat by mechanical jaws which grip and tear or cut the heat off and moving said jaws to pull the head away from the fish body portion.

3. A method according to claim 1 wherein said object is a fish which has been beheaded and said method steps are used for extracting roe or milt from the beheaded fish, said step of placing said object includes the step of placing said beheaded fish so as to engage a surface of said fluid-tight, flexible wall of said bag whereby the beheaded fish is squeezed by the application of a fluid pressure behind said wall, and said method further including the step of increasing the fluid pressure until the roe or the milt is squeezed out.

4. A method for releasable mechanical seizure of an object relative to a supporting surface, comprising the steps of: placing said object adjacent one side wall of a flexible, fluid-type bag, surrounding said object at least partially with walls of said fluid-tight bag, outside which fluid under pressure can be introduced, and introducing fluid pressure at the opposite side of the bag wall so as to urge said bag wall against said object, whereby the object is engaged by friction between at least a portion of the object is engaged by said bag walls being arrested relative to said supporting structure.

5. An apparatus for releasable, seizure of a fish relative to a supporting structure comprising, a tube-formed casing, a fluid-tight, flexible bag arranged in said casing and adapted so that the fish may be introduced into the casing with the head being free of the bag, means for connecting said bag to a supply of fluid pressure for supplying pressurized fluid to and from the bag, said casing and said bag being adapted to seize said fish by surface friction against at least a part of the fish body portion upon introduction of fluid under pressure into the bag, and a pair of jaws adapted for gripping the fish head and for cutting or tearing it away from the fish body.

6. An apparatus according to claim 5, CHARACTERIZED by said jaws having rounded cutting edges being adapted to close, leaving a gap sufficiently small to separate the head from the body and to hold the fish head firmly but wide enough to leave at least a portion of the entrails appended to the head.

7. An apparatus for driving out roe or milt from a beheaded fish, CHARACTERIZED by comprising a tube-formed casing, a fluid-tight, flexible bag arranged in said casing so that said beheaded fish may be introduced into said casing, means for introducing and releasing fluid under pressure into said bag, said casing and said bag being adapted so that said beheaded fish is seized by surface friction upon the introduction of fluid under pressure into said bag, said bag being adapted to apply an essentially uniformly distributed pressure over a substantial portion of the body of the fish so that the roe or milt is expelled from the beheaded fish by fluid pressure in said bag.

8. An apparatus according to claim 7, CHARACTERIZED by said bag being a toroidal bag arranged in said casing so that it may roll along the inside of the tubular casing, said bag having a centrally located opening, and means for driving said behead fish, once its tail end has ben introduced into said centrally located opening with its tail end leading along said tubular casing so that said toroidal bag rolls along the inside of said tubular casing while progressively applying pressure onto the sides of the beheaded fish, starting from the tail end to squeeze the roe or milt out of the beheaded fish.

* * * * *

UNITED STATES PATENT AND TRADEMARK OFFICE
CERTIFICATE OF CORRECTION

PATENT NO. : 5,045,023
DATED : September 3, 1991
INVENTOR(S) : Henrik M. Nielsen It is certified that error appears in the above-identified patent and that said Letters Patent is hereby corrected as shown below:

Column 2, line 2 "entails" should be --entrails--.

Column 2, line 4 "horisontal" should be --horizontal--.

Column 2, line 48 "versitility" should be --versatility--

Column 10, line 23 "object is engaged by said bag" should be --object surface, and said bag--.

Column 10, line 62 "ben" should be --been--.

Signed and Sealed this

Eighteenth Day of January, 1994

Attest:

BRUCE LEHMAN

*Attesting Officer*     *Commissioner of Patents and Trademarks*